July 4, 1967  A. J. GIAMBELLUCA, JR  3,328,970
PIPE REPAIR BELL
Filed July 21, 1964
2 Sheets-Sheet 1
FIG.1
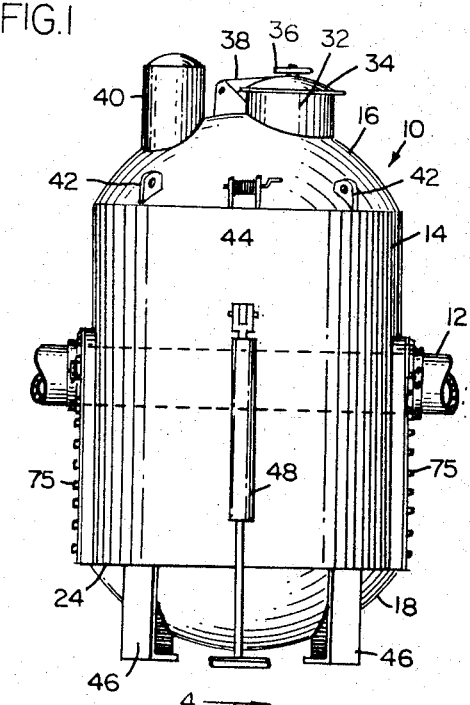
FIG.4
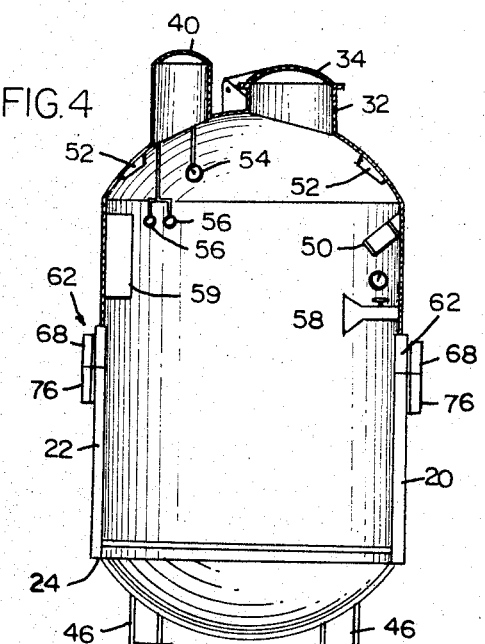
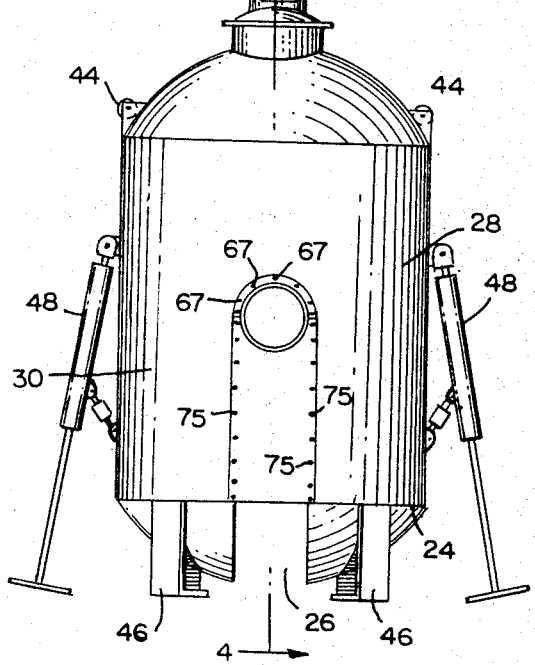
FIG.3
FIG.2
INVENTOR
ANTHONY J. GIAMBELLUCA JR
BY,
Wolf, Greenfield & Hieken
ATTORNEYS

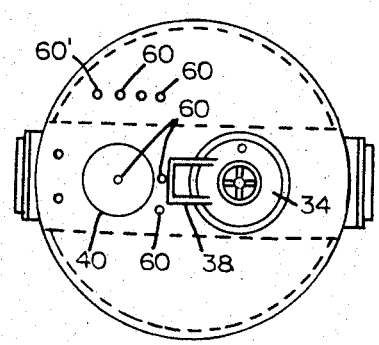
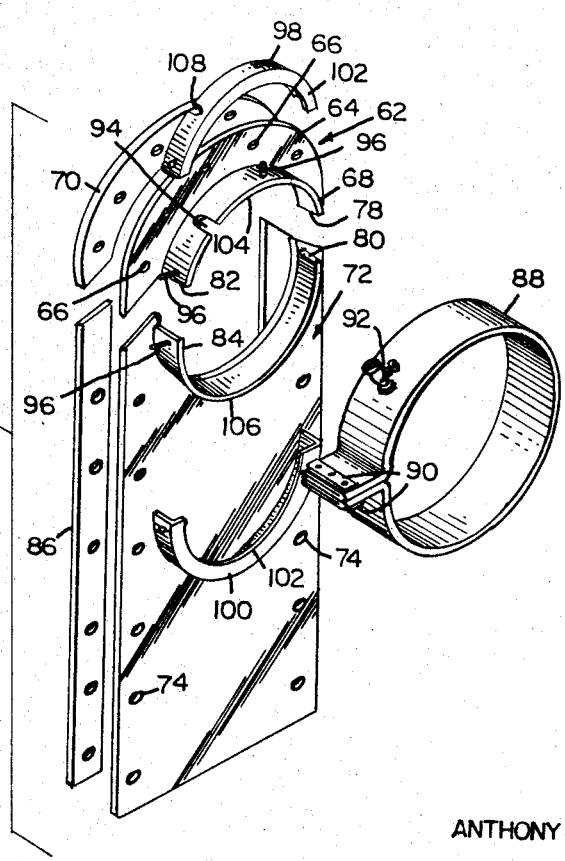

United States Patent Office 3,328,970
Patented July 4, 1967

3,328,970
PIPE REPAIR BELL
Anthony J. Giambelluca, Jr., 512 Rio Vista Ave.,
New Orleans, La. 70121
Filed July 21, 1964, Ser. No. 384,210
5 Claims. (Cl. 61—69)

This invention relates to underwater chambers and more particularly comprises a new and improved underwater pipe repair bell. The repair bell of this invention enables divers to work on isolated sections of pipe in very deep water with substantially the same freedom that they would have when repairing a pipe on dry land.

One important object of this invention is to provide a pipe repair bell which may straddle a submerged pipe section requiring work and provide a chamber about that section in which the diver may work comfortable unencumbered by a mask or other special breathing apparatus.

Another important object of this invention is to provide an underwater pipe repair bell which may easily be mounted in a straddling position about a section of pipe requiring repair and which includes means for sealing the joints between the pipe and the walls of the bell through which the pipe extends.

Still another important object of this invention is to provide an underwater pipe repair bell having a ready source of air for a diver even before the water in the bell is evacuated.

Yet another important object of this invention is to provide an underwater pipe repair bell which may be opened from the top and which is constantly open at the bottom, so as to provide a ready means for entering and leaving the bell chamber.

To accomplish these and other objects, the underwater pipe repair bell of this invention includes walls defining a bell body. A pair of opposed openings are provided in the walls, which openings extend upwardly from the bottoms of the walls so as to enable the body to straddle a pipe with a section of the pipe disposed within the body. Means are provided in the walls of the body about the openings for sealing the openings about the outer surface of the pipe to prevent water from entering the body. A hatch door is provided in the top of the body through which a driver may enter the body, and the bottom of the body is open so that the water in the body when the body is submerged, may be evacuated.

These and other objects and features of this invention along with its incident advantages will be better understood and appreciated from the following detailed description of one embodment thereof, selected for purposes of illustration and shown in the accompanying drawing, in which:

FIG. 1 is a side elevation of an underwater pipe repair bell constructed in accordance with this invention and shown enclosing a section of pipe requiring repair;

FIG. 2 is a side view of the pipe repair bell shown in FIG. 1;

FIG. 3 is a view similar to FIG. 2 but with a portion of the doors in the bell wall removed;

FIG. 4 is a vertical cross-sectional view taken along the section line 4—4 of FIG. 2;

FIG. 5 is a top view of the pipe repair bell shown in FIGS. 1–4; and

FIG. 6 is an exploded perspective view of the pipe door and sealing tube assembly.

The repair bell 10 is shown in FIGS. 1 and 2 to surround a section of pipe 12 upon which work is to be performed. The bell includes a cylindrical body 14 closed at its top by a dome 16 and a dish-shaped bottom 18 which only partially closes the bottom of the body 14, as is evident in FIG. 2.

A pair of slots or openings 20 and 22 are provided in the cylindrical wall 14 of the body, which slots extend upwardly from the lower edge 24 to approximately the center of the body. The slots 20 and 22 are aligned with the one another 180° apart on the cylindrical wall. The dish-shaped bottom 18 is provided with a slot 26 which is aligned with the slots 20 and 22 in the cylindrical wall. The slot 26 in the bottom wall 18 extends fully across the body 14. It is evident that the slots 20 and 22 allow the body 14 of the bell to straddle a pipe in the manner shown in FIGS. 1 and 2. That is, the body 14 may be lowered onto a pipe so that its two sides 28 and 30 extend downwardly below the pipe with the pipe extending through the middle of the body.

The dome 16 on the upper end of the body has a hatch 32 closed by a hatch door 34 controlled by a wheel lock 36. When the lock is open, the door 34 may be pivoted around its hinge support 38 to open the hatch to allow access to the interior of the bell. A cylindrical housing 40 is also mounted on the dome 16 and extends upwardly above the height of the door 34 of the hatch. The chamber 40 provides an air lock accessable from the inside of the body 14 and is large enough to receive the head of a diver in the body 14. The dome 16 also carries several lift eyes 42 about its periphery, as well as cable winches 44.

Four stationary legs 46 extend downwardly from the lower edge 24 of the side wall 28, and a pair of hydraulically operated legs 48 are hinged to the cylindrical wall of the body. The legs are shown in FIGS. 1 and 2 to support the body with the hydraulic legs in their extended position. In FIG. 3 the hydraulic legs 48 are shown withdrawn.

In FIG. 4 the interior of the bell is shown fitted with a television camera 50, interior dome lights 52, microphone 54, control valves 56, smoke hood 58, sealed locker 59, etc. In FIG. 5 a number of packing glands and valves 60 are shown in the dome through which such services as electric cables and ducts may enter the interior of the bell. These will be described in greater detail below. The valves includes main inlet and exhaust valves to support the diver in the bell and operate the hydraulic legs.

The pipe door and sealing tube assembly is shown in exploded form in FIG. 6 and is employed in the bell apparatus to close the slots 20 and 22 about the pipe 12 so as to seal the sides of the cylindrical wall 14. While but one assembly is shown and described, it is to be understood that one is used for each of the slots.

In FIG. 6 a semi-circular collar member 62 is shown having a base flange 64 through which a number of holes 66 extend. The holes 66 are aligned with mating studs 67 provided about the upper end of the U-shaped slots 20 and 22 in the cylindrical wall 14 of the bell so that the collar member 62 may be secured with its collar flange 68 extending outwardly generally perpendicular to the cylindrical wall. A packing gasket 70 is provided to form a water tight seal between the flange 64 of the collar member 62 and the surface of the cylindrical wall.

Each of the slots 20 and 22 is partially closed by a door 72 provided with rows of holes 74 along its side edges so that it may be bolted to the cylindrical wall along the sides of the slots. Threaded studs 75 are provided on the cylindrical wall 14 of the bell along the sides of the slots, and the door 72 may be slipped on the studs and be bolted in place. The door section 72 carries a semi-circular collar 76 which cooperates with the collar 68 of the member 62 to form a ring adapted to surround the pipe 12 which extends through the bell body. When the member 62 and door 72 are assembled in place on the body, the ends 78 and 80 of the collars 68 and 76 abut one another, while the opposite ends 82 and 84 of the collars are spaced apart a short distance. It should also be noted that gasket 86 may be provided along the sides of the door 72 to form water tight seals along the door edges with the margins of the slots 20 and 22.

An inflatable sealing tube 88 is shown in FIG. 6. The tube 88 is made of a length of flexible material sealed at its ends 90 and may be wrapped around the pipe 12 and extend out from between the collars 68 and 76 through the space between the edges 82 and 84. The tube 88 carries an air valve 92 that extends through the slot 94 in the collar 68 when the tube is disposed within the collars 68 and 76 about the pipe 12.

It will be noted in FIG. 6 that the collars 68 and 76 carry outwardly extending studs 96. The studs are provided to secure the two tube retainers 98 and 100 on the collars. The retainers 98 and 100 have flanges 102 which extend radially inwardly from the edges 104 and 106 of the collars to prevent the tubes from slipping out from within the collars. It will be noted that a slot 108 is provided in the retainer 98 to accommodate the air valve 92 on the tube.

A better appreciation of this invention may be gained through a description of its operation. The bell is designed to enable work to be done on pipes in very deep water by a diver within the chamber. The doors and sealing tube assemblies enable the bell to be mounted about a pipe and thereafter be closed to provide a chamber for the diver. Once the bell is in position and the pipe doors are mounted in place, air is pumped into the chamber to force the water in the chamber out through the bottom slot 26. Thus, the chamber is evacuated so that the diver may carry out his work.

Ordinarily the bell is transported by a barge to the location of the pipe section requiring repair. On the deck of the barge air hoses, telephone and light circuits, television circuits etc. are checked out to see that all is in proper order. Thereafter, the collar members 62 are bolted on each side of the wall 14 above the slots 20 and 22 over the rubber gaskets 70. The dome hatch door 34 is unlocked, opened and secured in the open position. The bell is then engaged by lines hooked to the eyes 42 on the dome and is lowered to the pipe section to be surrounded by it. Because the hatch door 34 is open, water can flow through the body 14 as it is lowered in the water and no great resistance is encountered. The lowering of the bell may be assisted by a diver or divers, and mooring weights may be set out on drag lines generally perpendicular to the direction in which the bell is being lowered. Stabilizing cables may be secured to the mooring weights, and the cables may be controlled by the winches 44 on the dome. In this manner the bell is lowered to a position in which it straddles the pipe 12 with its sides 28 and 30 on opposite sides of the pipe as is clearly evident in FIG. 2. The hydraulic legs 48 may be used to stabilize the bell when it reaches the floor of the body of water in which the pipe rests.

When the bell is in position, the door sections 72 are bolted over the slots 20 and 22 and the gaskets 86. Next the sealing tubes are wrapped about the pipe and slipped under the collars 68 and 76 which together define a ring about the pipe. As indicated above, each tube 88 is disposed in place with its air valve 92 extending upwardly through the slot 94 in the collar 68 and the ends 90 extend out the gap between edges 82 and 84. Thereafter, the retaining collars 98 and 100 are bolted on the collars 68 and 76 so that the flanges 102 hold the tubes 88 in place.

After the bell is assembled over the pipe section in the manner described, a diver may then couple an air hose to the air valve 92 and inflate it, to create a water tight joint about the pipe 12. Next, the diver enters the body 14 through the open hatch door 34. The diver may then use the cylindrical chamber 40 as an air lock to remove his diving mask and replace it with another which has hose connections within the chamber. The first mask may be hung outside the hatch for later use. Thereafter, the hatch door is closed as are the exhaust valves, and the main air inlet valve 60' on the dome 16 is open. As air enters the body, the water in it is displaced through the open slot 26 in the bottom. When the interior of the chamber is fully evacuated in this manner, the diver may remove his mask and begin work on the pipe section within the body. The dome lights serve their obvious purpose, and the television camera is available to monitor the work of the diver from the deck of the barge. The water tight locker 59 within the body may house all or most of the diver's tools. Further, air brushes, chisels and other tools necessary to carry out the work of the diver may be provided on the inside of the body so as to be available when the work is performed. Fumes and smoke generated by such operations as welding and grinding may be sucked out of the bell through the hood 58. Through the communications system the diver is in constant contact with the men on the barge.

From the foregoing description it will be appreciated that numerous modifications may be made of the invention without departing from the spirit of the invention. For example, the specific manner in which utilities are supplied to the diver within the bell may be varied without departing from the spirit of this invention. It will also be recognized that the versatility of the device may be enhanced by providing doors of different sizes so as to enable the bell to be used to repair pipes of different diameter. Because numerous modifications may be made of this invention without departing from its spirit, it is not intended to limit the breadth of this invention to the single embodiment illustrated and described. Rather, it is intended that the breadth of this invention be determined by the appended claims and their equivalents.

What is claimed is:
1. A pipe repair bell comprising
 a generally cylindrical body having its axis oriented vertically and having a dome closing the upper end,
 two inverted U-shaped slots extending upwardly from the bottom of the cylindrical wall and disposed 180° apart about the cylindrical wall, said slots terminating at their upper ends appreciably below the dome,
 semi-circular members removably secured about the upper ends of each of the slots describing an arc of approximately 180°, said members having collars which extend perpendicular to the cylindrical wall and coincide with the edge of the U-shaped slots,
 doors removably secured over the U-shaped slots and having semi-circular collars at their upper ends which cooperate with the collars on the members to form circular rings at the tops of the slots when the doors are secured in place over the slots whereby a pipe under repair may extend through the rings and pass through the body,
 inflatable sealing tubes lying within the collars and adapted to engage the outer surface of the pipe extending through the rings, said tubes forming a water tight seal between the pipe surface and the rings when inflated,
 retaining collars removably secured to the inverted semicircular collars for holding the tubes within said collars about the pipe,
 a hatch door provided in the dome through which access may be gained to the inside of the body,
 a chamber provided in the dome to form an air lock in communication with the interior of the body,
 and air inlet and exhaust valves providing in the dome through which air may be directed into and out of the body when the hatch is closed.

2. In a pipe repair bell,
 walls defining a bell body with said body being open at the bottom, means for connecting an air line to the body to drive out water in the body through the open bottom, a pair of opposed slots in the walls extending upwardly from the bottom of the walls of the body enabling the body to straddle a pipe with the pipe disposed in the slots, means including inflatable tubes disposed within the slots and adapted to form water tight seals about the pipes within the slots, an air lock housing projecting upwardly from the top of the body and having a bottom access opening through said top into the body, said housing being of a size large enough to receive the head of a diver within the body, and a hatch door in the top of the body adjacent to the housing providing access to the body.

3. A pipe repair bell as defined in claim 2 further characterized by, circular collars secured to the walls of the body about the slots and oriented to surround the pipe, said tubes lying within the collars so that when they are inflated they expand inwardly against the pipe.

4. A pipe repair bell as defined in claim 2 further characterized by, legs secured to the outer surface of the walls of the body, and means for extending the legs to support the body in the desired orientation.

5. A pipe repair bell as defined in claim 4 further characterized by, said legs being hydraulically operated.

References Cited

UNITED STATES PATENTS

| | | | |
|---|---|---|---|
| 617,750 | 1/1899 | Lake | 61—69 |
| 1,223,515 | 4/1917 | Papanastasiou | 61—69 X |
| 2,667,751 | 2/1954 | Osborn | 61—69 |
| 2,812,641 | 11/1957 | Elliott | 61—69 X |
| 3,166,123 | 1/1965 | Watkins | 61—69 X |

EARL J. WITMER, *Primary Examiner.*